continued

United States Patent [19]
Nagaoka et al.

[11] Patent Number: 5,004,793
[45] Date of Patent: Apr. 2, 1991

[54] ROOM TEMPERATURE-CURABLE COMPOSITION

[75] Inventors: Hisayuki Nagaoka; Michio Zenbayashi; Chiyuki Shimizu, all of Gunma, Japan

[73] Assignee: Toshiba Silicone Co., Ltd., Tokyo, Japan

[21] Appl. No.: 374,796

[22] Filed: Jul. 3, 1989

[30] Foreign Application Priority Data

Jul. 1, 1988 [JP] Japan .................. 63-164391

[51] Int. Cl.$^5$ ............................ C08G 77/06
[52] U.S. Cl. ........................ 528/15; 528/18; 528/19; 528/26; 528/33; 528/38; 528/34; 528/901
[58] Field of Search ............ 528/15, 18, 19, 33, 528/34, 26, 901, 38

[56]        References Cited
        U.S. PATENT DOCUMENTS 4,877,855 10/1989 Nagaoka et al. .............. 528/26
4,882,396 11/1989 Nagaoka et al. .............. 525/426

Primary Examiner—Melvyn I. Marquis
Attorney, Agent, or Firm—Sughrue, Mion, Zinn, Macpeak & Seas

[57]         ABSTRACT

A room temperature-curable composition comprising (a) 100 parts by weight of a siloxane-amide block copolymer represented by the formula (1)

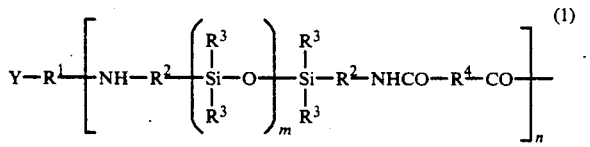

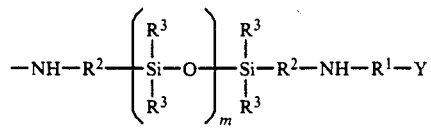

wherein
Y represents a hydrolyzable group-containing organosilyl group of the formula $-SiR^5_aX_{a-a}$
in which
R$^5$ represents a substituted or unsubstituted monovalent hydrocarbon group,
a is an integer of 0, 1 or 2, and
X is directly bonded to the silicon atom and represents a hydolyzable group or a hydroxyl group,
R$^1$ represents a divalent group selected from the group consisting of

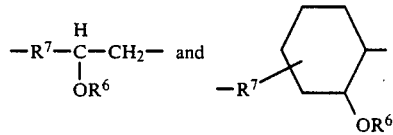

in which
R$^6$ represents a hydrogen atom, a substituted or unsubstituted monovalent hydrocarbon group, or an organosilyl group of the formula $-SiR^8_bX_{3-b}$
in which
R$^8$ represents a substituted or unsubstituted monovalent hydrocarbon group,
b is an integer of 0, 1, 2, or 3, and X is the same as defined above, and
R$^7$ represents a substituted or unsubstituted divalent hydrocarbon group which has 1 to 8 carbon atoms and may contain an ether bond including an oxygen or sulfur atom,
R$^2$ represents a substituted or unsubstituted divalent hydrocarbon group,
R$^3$ represents a substituted or unsubstituted monovalent hydrocarbon group,
R$^4$ represents a substituted or unsubstituted divalent aromatic hydrocarbon group, and
m and n each independently is a number of 1 or more;
(b) 0 to 25 parts by weight of a crosslinking agent; and
(c) 0.01 to 3 parts by weight of a curing catalyst.

10 Claims, No Drawings

ROOM TEMPERATURE-CURABLE COMPOSITION

FIELD OF THE INVENTION

This invention relates to a room temperature-curable composition containing a novel siloxane-amide block copolymer. More particularly, it is concerned with a room temperature-curable composition which gives a cured composition having excellent oil resistance and high mechanical strength.

BACKGROUND OF THE INVENTION

As is generally known, silicone polymers are quite unlike the other organic polymers in having several unique properties. For example, in the case of the silicone rubbers, those can retain their rubber elasticity even at high temperatures over a long period of time, and the rubber elasticity cannot be lost even at a temperature as low as $-70°$ C., with the rubber-like properties changing little with temperature. Further, the silicone rubbers show stable electrical properties over a wide temperature range, and have excellent arc resistance, corona resistance, weatherability, etc. Furthermore, the silicone rubbers undergo no deterioration in rubber-like properties even through long-term outdoor exposure, irradiation with ultraviolet rays, or exposure to an ozonic atmosphere. As described above, the silicone polymers have excellent properties necessary for rubber materials, and due to this fact the polymers have been spread throughout almost all the industrial fields, where the polymers are valued as essential materials.

However, the silicone polymers are inferior in strength to other organic polymers. For example, room temperature-curable silicone rubber compositions which are used as sealants for outer walls of buildings, etc., are not employable as a structural material due to their poor strengths, and their use is limited to sealants. As described above, because of their low strengths, the silicone rubbers have a disadvantage that they cannot be used as a general-purpose resin or an engineering plastic and their use is restricted to special purpose of use only.

Room temperature-curable silicone rubber compositions are also used, due to their in-site forming properties, as formed in-place type gaskets (FIPG) for the sealing around automobile engines. This application is favorable for inventory control and production efficiency and is also advantageous in sealing properties and heat resistance. However, the oil resistance of the gaskets formed from the silicone rubber compositions is insufficient, so that oil leakages occur when newly developed gear oils containing large proportions of additives are used, and this has become a problem.

In attempts to solve those problems of the silicone rubbers, JP-A-59-80463 proposes a method for improving the oil resistance but there is no description therein concerning improvement in the strength, and JP-A-60-219284 proposes methods for improving the oil resistance and also lowering the elasticity modulus but fails to teach a method for obtaining a silicone rubber having a sufficiently high strength. (The term "JP-A" as used herein means an "unexamined published Japanese patent application".)

SUMMARY OF THE INVENTION

As a result of intensive studies on the development of a composition free from the problems of the conventional compositions, it has been found that use of a specific siloxane-amide block copolymer represented by the formula (1) given below as a base polymer for preparing a room temperature-curable composition can provide a room temperature-curable composition which gives a cured composition having excellent oil resistance and high mechanical strength. This invention has been completed based on this finding.

Accordingly, an object of the present invention is to provide a room temperature-curable composition which gives a cured composition having excellent oil resistance and high mechanical strengths, thus eliminating the above-described disadvantages of the conventional room temperature-curable silicone compositions.

The room temperature-curable composition according to the present invention comprises (a) 100 parts by weight of a siloxane-amide block copolymer represented by the formula (1)

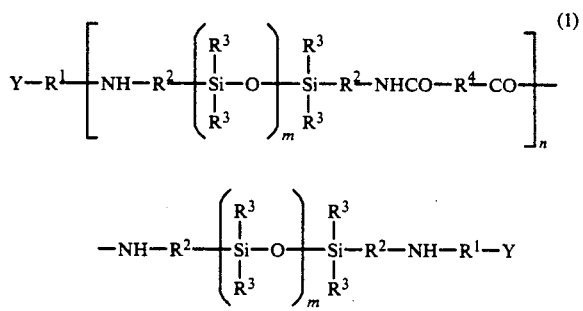

wherein

Y represents a hydrolyzable group-containing organosilyl group of the formula $-SiR^5_a X_{3-a}$
in which
$R^5$ represents a substituted or unsubstituted monovalent hydrocarbon group,
a is an integer of 0, 1 or 2, and
X is directly bonded to the silicon atom and represents a hydrolyzable group or a hydroxyl group,
$R^1$ represents a divalent group selected from the group consisting of

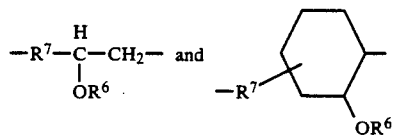

in which
$R^6$ represents a hydrogen atom, a substituted or unsubstituted monovalent hydrocarbon group, or an organosilyl group of the formula $-SiR^8_b X_{3-b}$
in which
$R^8$ represents a substituted or unsubstituted monovalent hydrocarbon group,
b is an integer of 0, 1, 2, or 3, and
X is the same as defined above, and
$R^7$ represents a substituted or unsubstituted divalent hydrocarbon group which has 1 to 8 carbon atoms and may contain an ether bond including an oxygen or sulfur atom,
$R^2$ represents a substituted or unsubstituted divalent hydrocarbon group,
$R^3$ represents a substituted or unsubstituted monovalent hydrocarbon group, R[4] represents a substituted or unsubstituted divalent aromatic hydrocarbon group, and m and n each independently is a number of 1 or more;

(b) 0 to 25 parts by weight of a crosslinking agent; and (c) 0.01 to 3 parts by weight of a curing catalyst.

DETAILED DESCRIPTION OF THE INVENTION

The siloxane-amide block copolymer, i.e., component (a) in the composition of this invention, represented by the formula (1) is prepared, for example, from a diaminosiloxane represented by the formula (2), a dicarboxylic acid dihalide represented by the formula (3), and an epoxysilane represented by the formula (4).

Formula (2)

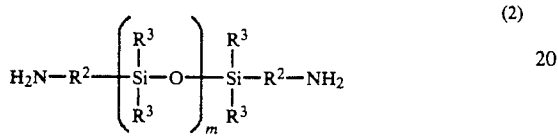

(wherein $R^2$ represents a substituted or unsubstituted divalent hydrocarbon group, $R^3$ represents a substituted or unsubstituted monovalent hydrocarbon group, and m is a number of 1 or more.)

Formula (3)

(wherein $R^4$ represents a substituted or unsubstituted divalent aromatic hydrocarbon group, and Z represents a halogen atom.)

Formula (4)

(wherein $R^5$ represents a substituted or unsubstituted monovalent hydrocarbon group; $R^9$ represents an epoxy group-containing organic group represented by

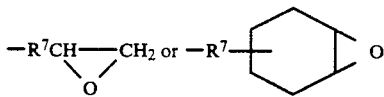

in which $R^7$ represents a substituted or unsubstituted divalent hydrocarbon group which has 1 to 8 carbon atoms and may contain an ether bond including an oxygen or sulfur atom; X is directly bonded to the silicon atom and represents a hydrolyzable group or a hydroxyl group; and a is an integer of 0, 1 or 2.)

In the diaminosiloxane of the formula (2), examples of the substituted or unsubstituted divalent hydrocarbon group of $R^2$ include trimethylene, tetramethylene, pentamethylene, phenylene, tolylene and dimethylphenylene. Examples of the substituted or unsubstituted monovalent hydrocarbon group of $R^3$ include methyl, ethyl, propyl, butyl, pentyl, hexyl, phenyl, tolyl, xylyl, halophenyl, halotolyl, cyanoethyl and 3,3,3-trifluoropropyl. Further, m is a number of 1 or more. Specific examples of such diaminosiloxane are:

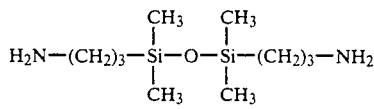

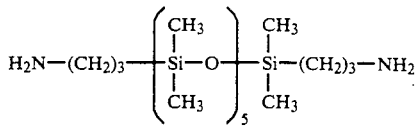

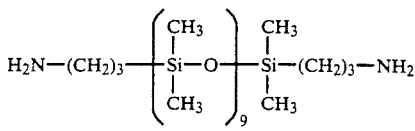

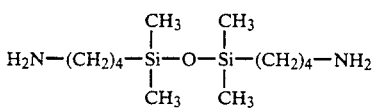

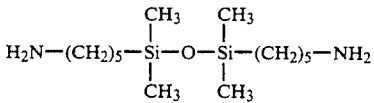

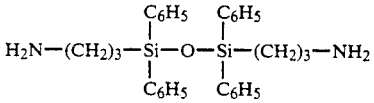

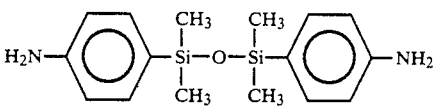

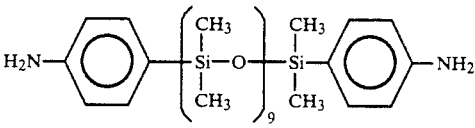

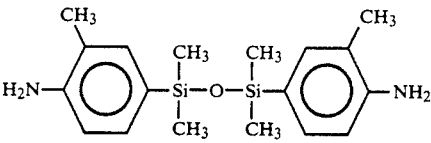

Those diaminosiloxanes may be used alone or in combination of two or more thereof.

In the dicarboxylic acid dihalide represented by the formula (3), examples of the substituted or unsubstituted divalent aromatic hydrocarbon group of $R^4$ include phenylene, tolylene, dimethylphenylene, halogenated phenylene, naphthalene, diphenyl ether, diphenylmethane, diphenyl sulfone, and diphenyl sulfide. Examples of the halogen atom of Z include chlorine, fluorine and bromine. Specific examples of such dicarboxylic acid dihalide are dichlorides, difluorides and dibromides of the following dicarboxylic acids: terephthalic acid, isophthalic acid, 1,4-naphthalenedicarboxylic acid, 1,5-naphthalenedicarboxylic acid, 2,6-naphthalenedicarboxylic acid, 3,3'-(diphenyl ether)dicarboxylic acid, 4,4'-(diphenyl ether)dicarboxylic acid, 4,4'-diphenylmethanedicarboxylic acid, 3,3'-diphenylmethanedicarboxylic acid, 4,4'-(diphenyl sulfide)dicarboxylic acid, and 3,3'-(diphenyl sulfide)dicarboxylic acid. Those dicarboxylic acid dihalides may be used alone or in combination of two or more thereof.

In the epoxysilane represented by the formula (4), examples of $R^9$ include γ-glycidoxypropyl, and β-(3,4-epoxycyclohexyl)ethyl. Examples of $R^5$ include methyl, ethyl, propyl, butyl, vinyl, allyl, phenyl and halophenyl. Further, X is directly bonded to the silicon atom and represents a hydrolyzable group or a hydroxyl group. Examples of the hydrolyzable group include methoxy, ethoxy, propoxy, β-methoxyethoxy, isopropenyloxy, diethylaminooxy and acetoxy.

Specific examples of such epoxysilane are γ-glycidoxypropyltrimethoxysilane, γ-glycidoxypropylmethyldiethoxysilane, γ-glycidoxypropyldimethylethoxysilane, γ-glycidoxypropyltris(methyl ethyl ketoxime)silane, γ-glycidoxypropyltriacetoxysilane, β-(3,4-epoxycyclohexyl)-ethyltrimethoxysilane, β-(3,4-epoxycyclohexyl)-ethylmethyldimethoxysilane, β-(3,4-epoxycyclohexyl)-ethyltris(methyl ethyl ketoxime)silane, and β-(3,4epoxycyclohexyl)ethyltriacetoxysilane.

The siloxane amide block copolymer represented by the formula (1) is prepared as follows. A diaminosiloxane of the formula (2) and a dicarboxylic acid dihalide of the formula (3) are subjected to polycondensation. After completion of the reaction, the resulting polycondensation product is washed with water and then dried to obtain a polymer. To this polymer is added an epoxysilane of the formula (4), and amino groups at both ends of each molecule of the polymer are reacted with epoxy groups in the epoxysilane, i.e., a ring-opening addition reaction is conducted.

The amounts of the diaminosiloxane and dicarboxylic acid dihalide used in the above process are not the equimolar amount, but should be such that the amount of the former is slightly larger than the latter in order to successfully conduct the subsequent reaction with the epoxysilane. Specifically, the amount of the diaminosiloxane to be subjected to the reaction is from 1.005 to 2.0 mol per mol of the dicarboxylic acid dihalide. The preferable amount thereof is in the range of from 1.01 to 1.5 mol. If the amount of the diaminosiloxane is below 1.005 mol, both ends of each of the resulting copolymer molecules cannot be always amino. On the other hand, if the amount is larger than 2.0 mol, it is difficult to increase the molecular weight of the copolymer to the extent that the copolymer shows good physical properties.

In the above process, the ring-opening addition reaction of epoxy groups in the epoxysilane results in the formation of hydroxyl groups as side chains around both ends of each molecule of the siloxane-amide block copolymer. Those hydroxyl groups may be retained in the copolymer as a reaction residue, but in the case that the hydrolyzable groups at both ends of each molecule show a high reaction activity to the hydroxyl groups, a reaction occurs between the hydroxyl group and the hydrolyzable group, resulting in occurrence of gelation with the lapse of time. Therefore, it is necessary that the hydroxyl groups are chemically modified.

Examples of such a chemical modification include an alkylsilylation, an alkoxylation and the like. Of those, an alkylsilylation is preferred from the standpoints of an easiness of chemical modification and a stability of the polymer modified and a cured composition thereof.

The alkylsilylation method is conducted such that in preparing a polymer containing hydrolyzable groups at both ends by reacting an epoxysilane with amino groups at both ends of the siloxane-amide block copolymer, a silylating agent is added. The silylating agent must be added in an amount larger than the chemical equivalent of the amount of hydroxyl groups formed as a reaction residue. Examples of the silylating agent are

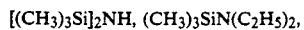

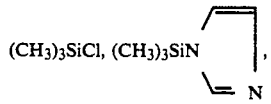

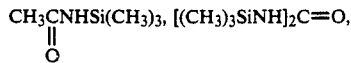

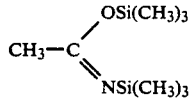

In this invention, the properties of the siloxane-amide block copolymer obtained by the method described above can be varied widely by changing the kind of the diaminosiloxane, the length of its siloxane unit segment, the kinds of the dicarboxylic acid dihalide and epoxysilane, and the proportions of those reactants, etc.

However, it is desirable for the siloxane-amide block copolymer thus obtained to sufficiently possess excellent mechanical properties, heat resistance, etc. which are characteristic of the polyamide, together with excellent processability.

The reaction conditions for the above process are described below in more detail. The temperature for the polycondensation is in the range of from 10° C. to 100° C., and it is preferred to use an inorganic or organic solvent and a basic catalyst in order to proceed the reaction easily. Examples of the inorganic solvent include aqueous solutions of sodium hydroxide, sodium carbonate, etc. Examples of the organic solvent include toluene, xylene, chlorobenzene, dichlorobenzene, hexane, octane, diethyl ketone, dibutyl ketone, cyclohexanone, chloroform, 1,2-dichloroethane, 1,1,2,2-tetrachloroethane, N,N-dimethylformamide, N,N-dimethylacetamide, and N-methyl-2-pyrrolidone. Those solvents may be used alone or in combination thereof. Examples of the basic catalyst are, for example, triethylamine and diisopropylmethylamine.

Further, the temperature for the ring-opening addition reaction, in which the epoxysilane reacts with amino groups at both ends of each polymer molecule, is preferably in the range of from 50° C. to 120° C.

Component (b) in the composition of this invention is a crosslinking agent which crosslinks the component (a) to form a network structure, and is selected from the known crosslinking agents used for conventional room temperature-curable silicone rubber compositions.

This is, component (b) is a silane represented by the formula $R^9{}_d SiZ_{4-d}$ (wherein $R^9$ represents a monovalent hydrocarbon group, Z represents a hydrolyzable group, and d is an integer of 0 to 2), or a partial hydrolysis condensation product obtained from the silane. Examples of $R^9$ are the same organic groups as those indicated to $R^3$ in component (a), and iminoalkyl groups such as

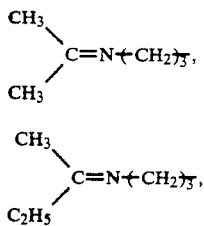

etc. Examples of the hydrolyzable group of Z include an alkoxy group (such as methoxy, ethoxy or propoxy), an alkenyloxy group (such as isopropenyloxy or 1-ethyl-2-methylvinyloxy), a ketoxime group (such as dimethyl ketoxime, methyl ethyl ketoxime or diethyl ketoxime), an acyloxy group (such as acetoxy, octanoyloxy or benzoyloxy), an amino group (such as dimethylamino, diethylamino, butylamino or cyclohexylamino), an aminooxy group (such as dimethylaminooxy or diethylaminooxy), and an amido group (such as N-methylacetamido, N-ethylacetamido or N-methylbenzamido). Specific examples of the compound of component (b) include ethyl silicate, propyl silicate, methyltrimethoxysilane, vinyltrimethoxysilane, methyltriethoxysilane, vinyltriethoxysilane, methyltris(methoxyethoxy)silane, vinyltris(methoxyethoxy)silane, methyltripropenoxysilane, methyltriacetoxysilane, vinyltriacetoxysilane, methyltri(acetone oxime)silane, vinyltri(acetone oxime)-silane, methyltri(methyl ethyl ketoxime)silane, vinyltri(methyl ethyl ketoxime)silane, and partial hydrolysis products obtained therefrom. Examples of component (b) further include cyclic siloxanes such as hexamethylbis(diethylaminooxy)cyclotetrasiloxane, tetramethyldibutyl-bis(diethylaminooxy)cyclotetrasiloxane, heptamethyl(diethylaminooxy)cyclotetrasiloxane, pentamethyltris(diethylaminooxy)cyclotetrasiloxane, hexamethyl-bis(methylethylaminooxy)cyclotetrasiloxane, and tetramethyl-bis(diethylaminooxy)-mono(methylethylaminooxy)cyclotetrasiloxane. Those compounds may be used alone or in combination of two or more thereof, as component (b).

The amount of the component (b) added to the composition is in the range of from 0 to 25 parts by weight per 100 parts by weight of component (a). In the case where component (a) is a self-crosslinking copolymer, component (b) is not essential, but it is preferred to add component (b) in a small amount from the standpoint of storage stability, if the composition takes a one-package form. If the amount of component (b) is larger than 25 parts by weight, an excess of the component (b) bleeds out during the curing to form a surface layer or insular parts, thereby impairing the properties of the cured composition, and further the shrinkage of the composition through curing becomes disadvantageously large.

Examples of the curing catalyst, component (c) in the composition of the present invention, include metal salts of carboxylic acids such as iron octoate, cobalt octoate, manganese octoate, zinc octoate, tin naphthenate, tin caprylate and tin oleate; and organotin compounds such as dibutyltin diacetate, dibutyltin dioctoate, dibutyltin dilaurate, dibutyltin dioleate, diphenyltin diacetate, dibutyltin oxide, dibutyltin dimethoxide, dibutylbis(triethoxysiloxy)tin, and dioctyltin dilaurate. Of those, an organotin compound is preferred because the compound has a high catalytic activity and is effective even when it is present in a trace amount. The amount of the curing catalyst, component (c), is from 0.01 to 3 parts by weight per 100 parts by weight of component (a). If the amount thereof is below 0.01 part by weight, the time required for curing is disadvantageously increased and, further, uncured parts remain in the cured composition. On the other hand, a composition with a component (c) content larger than 3 parts by weight is also disadvantageous in that both the storage stability of the composition and the heat resistance of the cured composition are impaired.

If desired and necessary, the room temperature-curable composition of this invention may appropriately contain fillers and other additives so long as the additives used do not impair the effects of this invention.

Such fillers include reinforcing or non-reinforcing fillers, volume-increasing fillers, electroconductive fillers, heat-transferring fillers, heat-resistant fillers, etc.

Other additives include various additives such as an adhesion promoter, a pigment, a thixotropic agent, a viscosity modifier for improving extrudability, an ultraviolet screener, a mildew-proofing agent, a solvent, a heat stabilizer, and a flame retarder.

The composition of the present invention can be obtained by blending all of the above-described components (a), (b) and (c), and various additives if necessary, while moisture is kept excluded therefrom.

The thus-obtained composition may be stored as it is in a sealed container for use as a one-pack type room temperature curable composition, curing of which occurs only when it is actually used and exposed to the moisture in air.

Alternatively, the components (a) to (c) may be used as a two-pack type room temperature-curable composition. That is, the components (a), (b) and (c), and optionally additives are suitably separately packed in respective containers and stored, and they are mixed with each other when used to give a composition of the present invention.

The room temperature curable composition according to the present invention gives cured compositions having modified mechanical properties showing high mechanical strength as well as excellent oil resistance.

Due to the above improvements, the composition of this invention can be advantageously used not only in the fields where conventional room temperature-curable silicone rubber compositions are used but also in the fields where general-purpose resins or engineering plastics are used. Furthermore, the composition of the present invention is extremely useful as a highly functional material, for which new uses will be found.

The present invention will now be described in more detail by reference to the following Examples, which should not be construed to be limiting the scope of the invention. In the Examples, all parts are by weight.

REFERENCE EXAMPLE 1 Synthesis of Siloxane-Amide Block Copolymer

To 38.3 parts of anhydrous xylene were added 40.3 parts of diaminopropylsiloxane of the formula

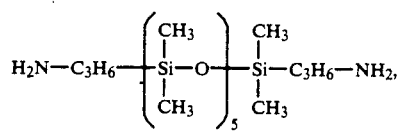

22.5 parts of triethylamine and 2.8 parts of N-methyl-2-pyrrolidone, and the resulting mixture was stirred under a nitrogen atmosphere.

13.7 Parts of terephthalic acid dichloride was dissolved in 38.3 parts of anhydrous xylene containing 2.8 parts of N-methyl-2-pyrrolidone, and this solution was added dropwise at room temperature to the above-obtained liquid mixture which was under stirring. After completion of the addition, the resulting mixture was stirred at room temperature for 1 hour and then at 80° C. for 8 hours to conduct polymerization. The thus-obtained polymerization product was washed with water several times and then dried under reduced pressure. Gel Permeation Chromatography (GPC), ¹H-NMR spectrum analysis and infrared absorption spectrum analysis revealed that this product was a siloxane-amide block copolymer of the formula:

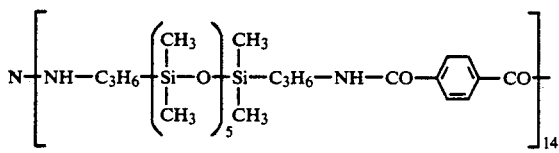

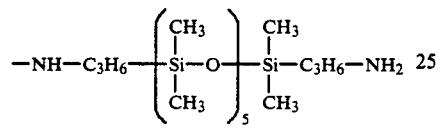

To 51.0 parts of this copolymer was added 0.20 part of ammonium chloride. While stirring the resulting mixture at 100° C. under a nitrogen atmosphere, 2.84 parts of γ-glycidoxypropyltrimethoxysilane were added dropwise and then 0.98 part of hexamethyldisilazane were added dropwise. After completion of the addition, the stirring was continued for 2 hours under the same conditions to proceed a reaction.

After completion of the reaction, an excess of the silane, silazane, etc. was removed at 100° C. under reduced pressure, thereby obtaining a transparent, reddish orange product. Upon infrared absorption spectrum analysis, this product was found to be a siloxane-amide block copolymer of the following formula, which was component (a) of the composition of this invention.

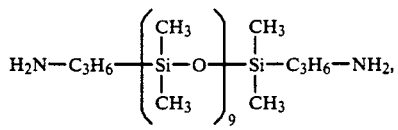

and 26.5 parts of triethylamine, and the resulting mixture was stirred under a nitrogen atmosphere.

16.0 Parts of isophthalic acid chloride was dissolved in 58.0 parts of anhydrous xylene containing 1.6 parts of N-methyl-2-pyrrolidone, and this solution was added dropwise at room temperature to the above-obtained liquid mixture which was under stirring. After completion of the addition, the resulting mixture was stirred at room temperature for 1 hour and then at 80° C. for 1 hour to conduct polymerization. The thus-obtained polymerization product was washed with water several times and then dried under reduced pressure. GPC, ¹H-NMR spectrum analysis and infrared absorption spectrum analysis revealed that this product was a siloxane-amide block copolymer of the formula:

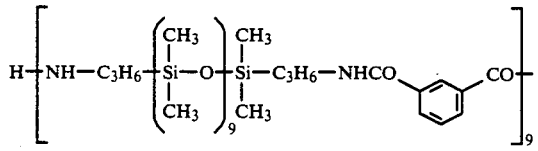

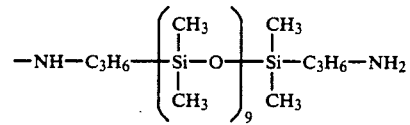

To 88.0 parts of this copolymer was added dropwise with stirring 5.06 parts of β-(3,4-epoxycyclohexyl)ethylmethyldimethoxysilane at 80° C. under a nitrogen atmosphere, and 1.77 parts of hexamethyldisilazane was then added dropwise thereto. After completion of the addition, the stirring was continued for 2 hours under

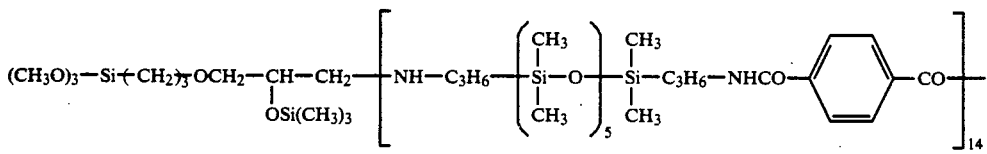

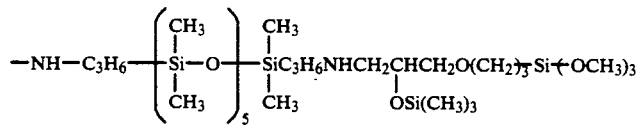

REFERENCE EXAMPLE 2 Synthesis of Siloxane-Amide Block Copolymer

To 58.0 parts of anhydrous xylene were added 9.8 parts of diaminopropylsiloxane of the formula the same conditions to proceed a reaction. After completion of the reaction, an excess of the silane, silazane, etc. was removed at 80° C. under reduced pressure, thereby obtaining a transparent, light yellow product. Upon infrared absorption spectrum analysis, this product was found to be a siloxane-amide block copolymer of the following formula, which was component (a) of the composition of this invention.

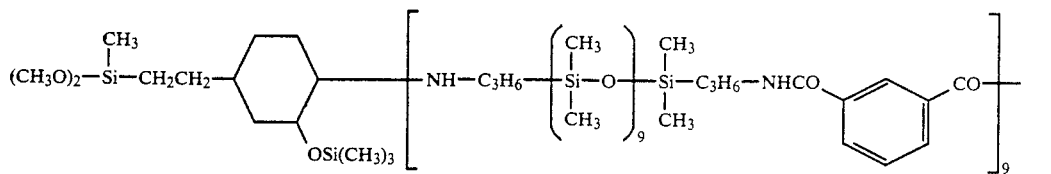
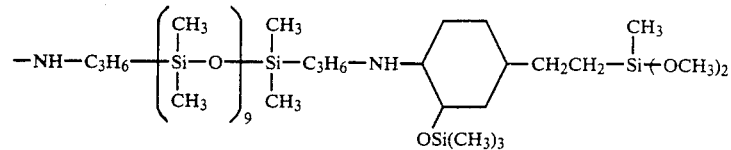

REFERENCE EXAMPLE 3 Synthesis of Siloxane-Amide Block Copolymer

To 384 parts of ion-exchanged water were added 50.0 parts of diaminopropylsiloxane of the formula

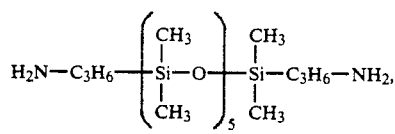

and 16.3 parts of anhydrous sodium carbonate, and the resulting mixture was stirred.

15.6 Parts of terephthalic acid dichloride wa dissolved in 123.2 parts of 1,2-dichloroethane, and this solution was added dropwise at room temperature to the above-obtained liquid mixture which was under stirred. After completion of the addition, the resulting mixture was stirred at room temperature for 8 hours to conduct polymerization. The thus-obtained polymerization product was washed with water several times and then dried under reduced pressure. GPC, ¹H-NMR spectrum analysis and infrared absorption spectrum analysis revealed that the product was a siloxane-amide block copolymer of the formula:

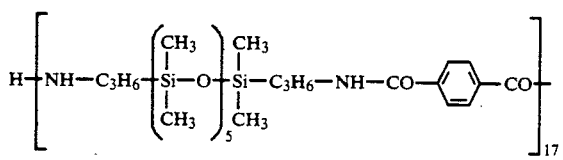

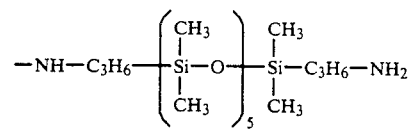

To 55.0 parts of this copolymer was added 0.16 part of ammonium chloride. While stirring the resulting mixture at 100° C. under a nitrogen atmosphere, 2.60 parts of γ-glycidoxypropyltrimethoxysilane was added dropwise and then 0.81 part of hexamethyldisilazane were added dropwise. After completion of the addition, the stirring was continued for 3 hours under the same conditions to proceed a reaction. After completion of the reaction, an excess of the silane, silazane, etc. was removed at 100° C. under reduced pressure, thereby obtaining a transparent, light yellow product. Upon infrared absorption spectrum analysis, this product was found to be a siloxane-amide block copolymer of the following formula, which was component (a) of the composition of this invention.

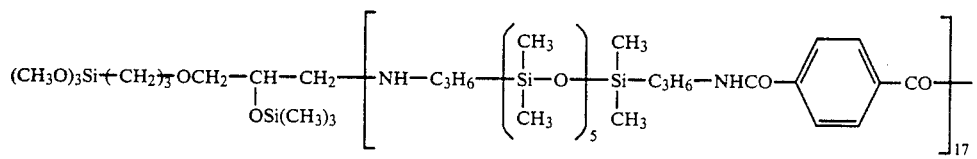
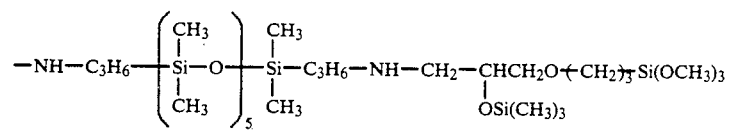

EXAMPLE 1

To 25.0 parts of the siloxane-amide block copolymer as obtained in Reference Example 1 were added 1.28 parts of methyltrimethoxysilane and 0.03 part of dibutylbis(triethoxysiloxy)tin at 80° C., and they were mixed with each other until the mixture became uniform, while moisture was kept excluded therefrom, thereby obtaining a composition. The thus-obtained composition was cooled to room temperature and then degassed. This composition was formed into a sheet having a thickness of 2 mm, and then allowed to stand at 20° C. under 55% RH for curing. After the sheet was left for 7 days, the thus-obtained cured sheet was evaluated for hardness, tensile strength and oil resistance in accordance with the Testing Method for Physical Properties of Vulcanized Rubbers as defined in JIS K 6301. As a result, the cured sheet exhibited a high tensile strength and good oil resistance as shown in Table 1.

TABLE 1

|  | Hardness | Tensile strength | Oil resistance (JIS No. 3 oil; 150° C. × 72 hr) |
| --- | --- | --- | --- |
| Example 1 | 85 | 73 kgf/cm$^2$ | +3.8 vol % |

EXAMPLE 2

To 25.0 parts of the siloxane-amide block copolymer as obtained in Reference Example 1 were added 1.48 parts of vinyltris(methyl ethyl ketoxime)silane and 0.02 part of dibutyltin dilaurate at 80° C., and they were mixed with each other until the mixture became uniform, while moisture was kept excluded therefrom, thereby obtaining a composition. The thus-obtained composition was cooled to room temperature and then degassed. This composition was formed into a sheet having a thickness of 2 mm, and then allowed to stand at 20° C. under 55% RH for curing. After the sheet was left for 7 days, the thus-obtained cured sheet was evaluated for hardness, tensile strength and oil resistance in accordance with JIS K 6301. As a result, the cured sheet exhibited a high tensile strength and good oil resistance as shown in Table 2.

TABLE 2

|  | Hardness | Tensile strength | Oil resistance (JIS No. 3 oil; 150° C. × 72 hr) |
| --- | --- | --- | --- |
| Example 2 | 87 | 98 kgf/cm$^2$ | +3.5 vol % |

EXAMPLE 3

To 45.0 parts of the siloxane-amide block copolymer as obtained in Reference Example 2 were added 1.75 parts of vinyltrimethoxysilane and 0.04 part of dibutyltin oxide at 80° C., and they were mixed with each other until the mixture became uniform, while moisture was kept excluded therefrom, thereby obtaining a composition. The thus-obtained composition was cooled to room temperature and then degassed. This composition was formed into a sheet having a thickness of 2 mm, and then allowed to stand at 20° C. under 55% RH for curing. After the sheet was left for 7 days, the thus-obtained cured sheet was evaluated for hardness, tensile strength and oil resistance in accordance with the Testing Method for Physical Properties of Vulcanized Rubbers as defined in JIS K 6301. As a result, the cured sheet exhibited a high tensile strength and good oil resistance as shown in Table 3.

TABLE 3

|  | Hardness | Tensile strength | Oil resistance (JIS No. 3 oil; 150° C. × 72 hr) |
| --- | --- | --- | --- |
| Example 3 | 62 | 43 kgf/cm$^2$ | +4.5 vol % |

EXAMPLE 4

To 45.0 parts of the siloxane-amide block copolymer as obtained in Reference Example 2 were added 1.77 parts of methyltris(methyl ethyl ketoxime)silane and 0.03 part of dibutylbis(triethoxysiloxy)tin at 80° C. and they were mixed with each other until the mixture became uniform, while moisture was kept excluded therefrom, thereby obtaining a composition. The thus-obtained composition was cooled to room temperature and then degassed. This composition was formed into a sheet having a thickness of 2 mm, and then allowed to stand at 20° C. under 55% RH for curing After the sheet was left for 7 days, the thus-obtained cured sheet was evaluated for hardness, tensile strength and oil resistance in accordance with the Testing Method for Physical Properties of Vulcanized Rubbers as defined in JIS K 6301. As a result, the cured sheet exhibited a high tensile strength and good oil resistance as shown in Table 4.

TABLE 4

|  | Hardness | Tensile strength | Oil resistance (JIS No. 3 oil; 150° C. × 72 hr) |
| --- | --- | --- | --- |
| Example 4 | 67 | 50 kgf/cm$^2$ | +4.0 vol % |

COMPARATIVE EXAMPLE 1

To 45.0 parts of $\alpha,\omega$-dihydroxydimethyl polysiloxane having a viscosity as measured at 25° C. of 20,000 cSt, in place of the siloxane-amide block copolymer, were added 3.48 parts of methyltris(methyl ethyl ketoxime)silane and 0.04 part of dibutylbis(triethoxysiloxy)tin at 80° C., and they were mixed with each other until the mixture became uniform, while moisture was kept excluded therefrom, thereby obtaining a composition. The thus-obtained composition was cooled to room temperature and then degassed. This composition was formed into a sheet having a thickness of 2 mm, and then allowed to stand at 20° C. under 55% RH for curing. After the sheet was left for 7 days, the thus-obtained cured sheet was evaluated for hardness, tensile strength and oil resistance in accordance with JIS K 6301. As a result, the cured sheet showed a low tensile strength and poor oil resistance, as different from the cured sheets obtained in Examples 1 to 4. The results are shown in Table 5.

TABLE 5

|  | Hardness | Tensile strength | Oil resistance (JIS No. 3 oil; 150° C. × 72 hr) |
| --- | --- | --- | --- |
| Comparative Example 1 | 4 | 5.0 kgf/cm$^2$ | +50.0 vol % or more |

COMPARATIVE EXAMPLE 2

To 45.0 parts of $\alpha,\omega$-dihydroxydimethyl polysiloxane having a viscosity as measured at 25° C. of 20,000 cSt, in place of the siloxane-amide block copolymer, were added 4.5 parts of a dimethyl silicone oil having a viscosity as measured at 25° C. of 100 cSt and 7.0 parts of fumed silica, and they were mixed to give a uniform mixture. To the mixture were added 4.37 parts of methyltris(methyl ethyl ketoxime)silane and 0.05 part of dibutylbis(triethoxysiloxy)tin, and they were mixed until the mixture became uniform, while moisture was kept excluded therefrom, and then degassed, thereby obtaining a composition. This composition was formed into a sheet having a thickness of 2 mm, and then allowed to stand at 20° C. under 55% RH for curing. After the sheet was left for 7 days, the thus-obtained cured sheet was evaluated for hardness, tensile strength and oil resistance in accordance with JIS K 6301. As a result, the cured sheet showed a low tensile strength and poor oil resistance, as different from the cured sheets obtained in Examples 1 to 4. The results are shown in Table 6.

TABLE 6

|  | Hardness | Tensile strength | Oil resistance (JIS No. 3 oil; 150° C. × 72 hr) |
|---|---|---|---|
| Comparative Example 2 | 29 | 20 kgf/cm² | +37.0 vol % |

While the invention has been described in detail and with reference to specific embodiments thereof, it will be apparent to one skilled in the art that various changes and modifications can be made therein without departing from the spirit and scope thereof.

What is claimed is:

1. A room temperature-curable composition comprising (a) 100 parts by weight of a siloxane-amide block copolymer represented by the formula (1)

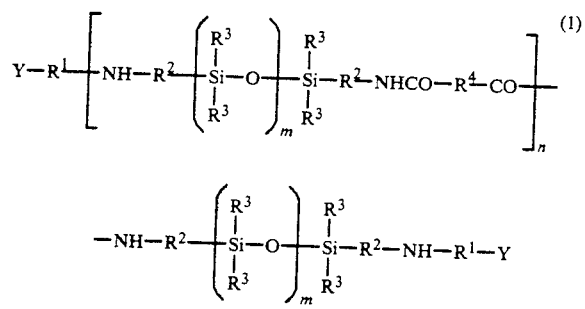

wherein

Y represents a hydrolyzable group containing organosilyl group of the formula $-SiR^5_aX_{3-a}$
in which
$R^5$ represents a substituted or unsubstituted monovalent hydrocarbon group,
a is an integer of 0, 1 or 2, and
X is directly bonded to the silicon atom and represents a hydrolyzable group or a hydroxyl group,
$R^1$ represents a divalent group selected from the group consisting of

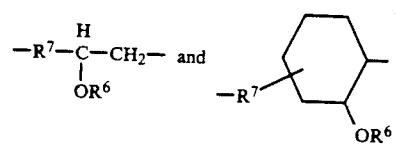

in which
$R^6$ represents a hydrogen atom, a substituted or unsubstituted monovalent hydrocarbon group, or an organosilyl group of the formula $-SiR^8_bX_{3-b}$
in which
$R^8$ represents a substituted or unsubstituted monovalent hydrocarbon group,
b is an integer of 0, 1, 2, or 3, and
X is the same as defined above, and
$R^7$ represents a substituted or unsubstituted divalent hydrocarbon group which has 1 to 8 carbon atoms and may contain an ether bond including an oxygen or sulfur atom,
$R^2$ represents a substituted or unsubstituted divalent hydrocarbon group,
$R^3$ represents a substituted or unsubstituted monovalent hydrocarbon group,
$R^4$ represents a substituted or unsubstituted divalent aromatic hydrocarbon group, and
m and n each independently is a number of 1 or more;

(b) 0 to 25 parts by weight of a crosslinking agent; and
    (c) 0.01 to 3 parts by weight of a curing catalyst.

2. A room temperature-curable composition as claimed in claim 1, wherein the siloxane-amide block copolymer of the formula (1) is obtained from a diaminosiloxane represented by the formula (2)

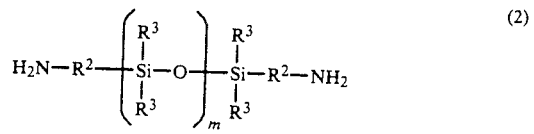

wherein $R^2$, $R^3$ and m are the same as defined in claim 1; a dicarboxylic acid dihalide represented by the formula (3)

wherein $R^4$ is the same as defined in claim 1, and Z is a halogen atom; and an epoxysilane represented by the formula

wherein $R^5$, X and a are the same as defined in claim 1; and $R^9$ represents an epoxy group-containing organic group represented by

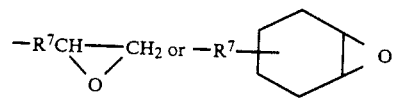

in which $R^7$ represents a substituted or unsubstituted divalent hydrocarbon group which has 1 to 8 carbon atoms and may contain an ether bond including an oxygen or sulfur atom; wherein said diaminosiloxane of the formula (2) and said dicarboxylic acid dihalide of the formula (3) are subjected to polycondensation to form a polycondensation product, whereafter the polycondensation product is washed with water and then dried to obtain a polymer, said epoxysilane of the formula (4) then being added to said polymer and then amino groups at both ends of the polymer are reacted with epoxy groups in the epoxysilane.

3. A room temperature-curable composition as claimed in claim 2, wherein the diaminosiloxane is at least one member selected from the group consisting of

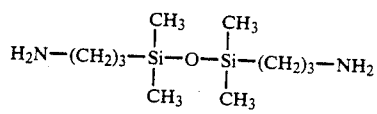

-continued

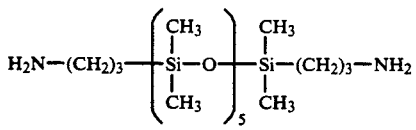

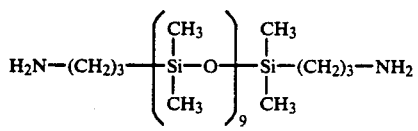

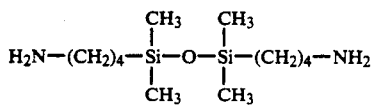

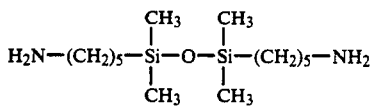

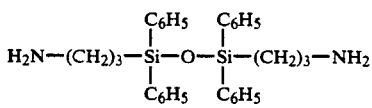

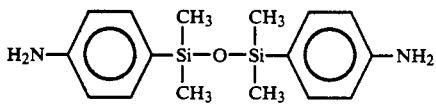

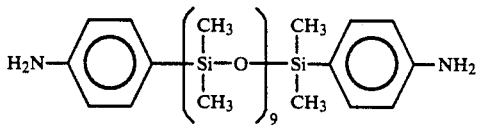

and

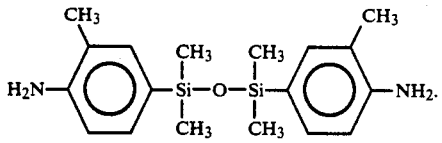

4. A room temperature-curable composition as claimed in claim 2, wherein the dicarboxylic acid dihalide is at least one member selected from the group consisting of dichlorides, difluorides and dibromides of terephthalic acid, isophthalic acid, 1,4-naphthalenedicarboxylic acid, 1,5-naphthalenedicarboxylic acid, 2,6-naphthalenedicarboxylic acid, 3,3'-(diphenyl ether)-dicarboxylic acid; 4,4'-(diphenyl ether)dicarboxylic acid, 4,4'-diphenylmethanedicarboxylic acid, 3,3'-diphenylmethanedicarboxylic acid, 4,4'-(diphenyl sulfide)dicarboxylic acid, and 3,3'-(diphenyl sulfide)-dicarboxylic acid.

5. A room temperature-curable composition as claimed in claim 2, wherein the epoxysilane is at least one member selected from the group consisting of ↓-glycidoxypropyltrimethoxysilane, γ-glycidoxypropylmethyldiethoxysilane, γ-glycidoxypropyldimethylethoxysilane, γ-glycidoxypropyltris(methyl ethyl ketoxime)-silane, γ-glycidoxypropyltriacetoxysilane, β-(3,4epoxycyclohexyl)ethyltrimethoxysilane, β-(3,4-epoxycyclohexyl)ethylmethyldimethoxysilane, β-(3,4-epoxycyclohexyl)ethyltris(methyl ethyl ketoxime)silane, and β-(3,4-epoxycyclohexyl)ethyltriacetoxysilane.

6. A room temperature-curable composition as claimed in claim 1, wherein the crosslinking agent is at least one member selected from the group consisting of ethyl silicate, propyl silicate, methyltrimethoxysilane, vinyltrimethoxysilane, methyltriethoxysilane, vinyltriethoxysilane, methyltris(methoxyethoxy)silane, vinyltris(methoxyethoxy)silane, methyltripropenoxysilane, methyltriacetoxysilane, vinyltriacetoxysilane, methyltri(acetone oxime)silane, vinyltri(acetone oxime)silane, methyltri(methyl ethyl ketoxime)silane, vinyltri(methyl ethyl ketoxime)silane, and partial hydrolysis products obtained therefrom.

7. A room temperature-curable composition as claimed in claim 1, wherein the crosslinking agent is at least one cyclic siloxane selected from the group consisting of hexamethyl-bis(diethylaminooxy)cyclotetrasiloxane, tetramethyldibutyl-bis(diethylaminooxy)cyclotetrasiloxane, heptamethyl(diethylaminooxy)cyclotetrasiloxane, pentamethyltris(diethylaminooxy)cyclotetrasiloxane, hexamethyl-bis(methylethylaminooxy)cyclotetrasiloxane and tetramethyl-bis(diethylaminooxy)-mono(methylethylaminooxy)cyclotetrasiloxane.

8. A room temperature-curable composition as claimed in claim 1, wherein the curing catalyst is selected from the group consisting of a metal salt of carboxylic acid and an organotin compound.

9. A room temperature-curable composition as claimed in claim 1, wherin Y—R¹— is

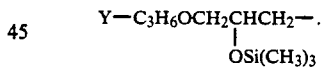

10. A room temperature-curable composition as claimed in claim 1, wherein Y—R¹— is

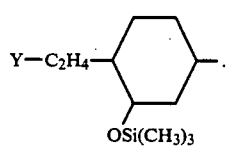

* * * * *